United States Patent [19]

Herrmann et al.

[11] Patent Number: 5,273,354
[45] Date of Patent: Dec. 28, 1993

[54] MOLDED REFRIGERATOR SHELF AND SUPPORT BRACKET

[75] Inventors: Robert S. Herrmann, Grand Haven; Edmund J. Kane, Holland; Donald C. Gilbert, Muskegon Heights, all of Mich.

[73] Assignee: Donnelly Corporation, Holland, Mich.

[21] Appl. No.: 721,104

[22] Filed: Jun. 25, 1991

Related U.S. Application Data

[63] Continuation-in-part of Ser. No. 665,661, Mar. 7, 1991.

[51] Int. Cl.$^5$ ............................................ F25D 11/00
[52] U.S. Cl. .................................................. 312/408
[58] Field of Search ................ 312/408, 410; 211/134, 211/153; 108/24, 27

[56] References Cited

U.S. PATENT DOCUMENTS

| | | |
|---|---|---|
| D. 295,950 | 5/1988 | Johnston . |
| 392,061 | 10/1888 | Peckham . |
| 786,935 | 4/1905 | Wright . |
| 870,439 | 11/1907 | Kade . |
| 907,423 | 12/1908 | Tilley . |
| 1,119,982 | 12/1914 | Ohnstrand . |
| 1,805,584 | 5/1931 | Kemp . |
| 1,878,072 | 9/1932 | Vance . |
| 2,169,295 | 8/1939 | Shuart . |
| 2,197,982 | 4/1940 | O'Brien . |
| 2,252,997 | 8/1941 | Vanderveld . |
| 2,505,322 | 4/1950 | Drake . |
| 2,517,725 | 8/1950 | Schweller . |
| 2,537,804 | 1/1951 | Watkins . |
| 2,568,153 | 9/1951 | Hickman . |
| 2,599,607 | 7/1952 | Burrise . |
| 2,604,375 | 7/1952 | Beckett . |
| 2,613,818 | 10/1952 | Richard . |
| 2,626,773 | 1/1953 | Backman . |
| 2,657,894 | 11/1953 | Sklenar . |
| 2,681,786 | 6/1954 | Sparring . |
| 2,689,778 | 9/1954 | Chambers et al. . |
| 2,735,741 | 2/1956 | Laben . |
| 2,739,777 | 3/1956 | Schoenhardt . |
| 2,954,125 | 9/1960 | Husted . |
| 3,028,638 | 4/1962 | Goellner . |
| 3,082,880 | 3/1963 | Mapson . |
| 3,092,047 | 6/1963 | Chesley . |
| 3,102,499 | 9/1963 | Shelor . |
| 3,120,077 | 2/1964 | Stoffel . |
| 3,127,146 | 3/1964 | Fisher . |
| 3,185,315 | 5/1965 | Andreassen . |
| 3,212,836 | 10/1965 | Johnson . |
| 3,220,364 | 11/1965 | Sandin . |
| 3,270,404 | 9/1966 | Andreassen . |
| 3,331,646 | 7/1967 | Peters . |
| 3,352,431 | 11/1967 | Smith . |

(List continued on next page.)

FOREIGN PATENT DOCUMENTS

| | | |
|---|---|---|
| 8535795.2 | 2/1986 | Fed. Rep. of Germany . |
| 9006513.1 | 8/1991 | Fed. Rep. of Germany . |
| 2111257 | 6/1972 | France . |
| 320487 | 11/1929 | United Kingdom . |
| 1002175 | 8/1965 | United Kingdom . |

Primary Examiner—Kenneth J. Dorner
Assistant Examiner—Gerald A. Anderson
Attorney, Agent, or Firm—Price, Heneveld, Cooper, DeWitt & Litton

[57] ABSTRACT

A molded refrigerator shelf useful for containment of spills on the shelf includes a shelf member with a rim molded around the perimeter edge of the shelf member to form a liquid tight seal between the rim and the shelf member. The molded rim projects above the top surface of the shelf member to form a liquid dam for containing spills to the shelf member. The shelf is cantilevered upon support brackets from the rear wall of a refrigerator. The support brackets are adapted to support the shelf at a plurality of vertical positions. The support brackets are integrally molded with the molded rim, or separately formed and attached to the rim during molding. Slide tracks are optionally provided on the support brackets for slidably receiving and supporting a storage bin or drawer beneath the shelf. Also, a drain is optionally provided to drain a spill from the shelf.

63 Claims, 5 Drawing Sheets

U.S. PATENT DOCUMENTS

| | | |
|---|---|---|
| 3,363,390 | 1/1968 | Crane et al. |
| 3,429,628 | 2/1969 | Laszlo . |
| 3,446,361 | 5/1969 | Douty . |
| 3,561,714 | 2/1971 | Zurawski et al. |
| 3,575,484 | 4/1971 | Kesling . |
| 3,603,274 | 9/1971 | Ferdinand et al. |
| 3,604,669 | 9/1971 | Asher . |
| 3,633,983 | 1/1972 | Whitcomb . |
| 3,672,624 | 7/1972 | Keller . |
| 3,862,784 | 1/1975 | Heinrich . |
| 3,912,085 | 10/1975 | Cooke et al. |
| 3,984,163 | 10/1976 | Boorman, Jr. et al. |
| 4,015,543 | 4/1977 | Stankowitz . |
| 4,072,340 | 1/1978 | Morgan . |
| 4,139,234 | 2/1979 | Morgan . |
| 4,167,259 | 9/1979 | Bury . |
| 4,174,486 | 11/1979 | Winkler . |
| 4,242,848 | 1/1981 | Schoultz . |
| 4,543,283 | 9/1985 | Curtze et al. |
| 4,627,201 | 12/1986 | Hamamoto et al. |
| 4,723,809 | 2/1988 | Kida et al. |
| 4,736,918 | 4/1988 | Bessinger . |
| 4,822,656 | 4/1989 | Hutter, III . |
| 4,841,698 | 6/1989 | Gold . |
| 4,870,907 | 10/1989 | McKee . |
| 4,923,260 | 5/1990 | Poulsen . |
| 4,934,541 | 6/1990 | Bussan et al. |
| 4,938,442 | 7/1990 | Mastrodicasa . |

MOLDED REFRIGERATOR SHELF AND SUPPORT BRACKET

CROSS REFERENCE TO RELATED APPLICATIONS

This is a continuation-in-part of U.S. Pat. application Ser. No. 07/665,661, entitled MOLDED REFRIGRATOR SHELF and filed on Mar. 7, 1991, the disclosure of which is hereby incorporated herein by reference.

BACKGROUND OF THE INVENTION

This invention relates to shelving for refrigerators and the like.

As is the nature of articles containing liquid which are stored in a refrigerator or freezer, many such articles are spillable and do spill. Such a spill will typically soak into other items or contaminate other foods in the refrigerated compartment. Extensive cleanup efforts are required since the spill will commonly flow down, through the compartment, from shelf to shelf. Therefore, it is desirable to provide containment measures for limiting the area of such a spill. One such measure is a spill resistant shelf. Such a shelf will contain a spill to the shelf and minimize if not preclude the downward flow of the spill through the compartment.

One such spill resistant shelf is disclosed in U.S. Pat. No. 4,934,541, entitled REFRIGERATOR SHELF AND METHOD OF MANUFACTURING and issued on Jun. 19, 1990 to Bussan et al. Therein, a refrigerator shelf is disclosed having a two-piece plastic "picture frame" circumscribing the periphery of a glass plate to provide a spill resistant refrigerator shelf. For liquid spill resistance, a silicon seal should be provided between the upper frame member and the glass plate, as disclosed by Bussan et al.

U.S. Pat. No. 3,633,983, entitled SHELF STRUCTURE and issued on Jan. 11, 1972 to Whitcomb, discloses the use of a glass shelf member which is framed by spaced, parallel side portions, an interconnecting rear portion and a portion extending transversely across the front of the glass. The front, side and rear framing portions are specified as being extruded material and having a glass receiving groove for receiving the glass shelf member. However, a liquid tight seal around the perimeter edge of the glass is not provided or suggested. A spill on this shelf, particularly of a liquid, will seep between the glass and the supporting frame, flowing down through the compartment.

Another problem common to the above discussed shelf structures still remains. That is, items which are spilled upon the shelves can seep between the glass plate shelf member and the surrounding frame members where it is virtually impossible to remove or otherwise clean. Thus and in spite of the sanitary benefits of using glass, an unsanitary condition can easily develop as food stuffs become trapped between the shelf members and frame members of the above-described shelf structures.

Even with the benefit of spill containment as provided by a spill resistant shelf, it can still be a tedious task to remove the spilled item from the shelf. This is especially so with spilled liquids which must be removed from the shelf, typically by sponging or mopping the spill with a rag or the like and conveying it to a bowl or pail. If one attempts to remove the shelf and pour the spill directly into a sink, the shelf will easily tip and the spill will readily pour over the edge of the shelf, defeating the principle purpose of the spill resistant shelf.

Another consideration in designing shelf structures for a refrigerated compartment is the circulation or convection of air through the compartment. It is desirable to provide for some means of circulation in order to maintain a homogeneous temperature distribution and avoid stratification. Without a provision for circulation, the air in the compartment will become stratified, having a range of temperature zones with a relatively warm zone at the top of the compartment and a relatively cold zone at the bottom of the compartment. Therefore, one will typically design the shelf structure to allow for air passage between the edges of the shelf and the walls of the compartment. However, this decreases the shelf surface area according to the amount of space provided between the shelf and the compartment walls. Further, in situations where a framing structure circumscribes the shelf, such as those discussed above, the width of the frame further reduces the available shelf area. Such reductions in shelf area directly reduce the capacity of the refrigerator to hold items. While the reduction in shelf area attributable to air passage around the shelf perimeter is dictated by thermodynamic performance, the lost area attributable to perimeter framing results from structural and design limitations imposed by accommodating the spill resistant shelf.

SUMMARY OF THE INVENTION

Accordingly, the present invention provides a refrigerator shelf having a molded, liquid tight, perimeter rim. The molded rim both maximizes the spill retention capability of the shelf and minimizes the potential for inaccessible entrapment of a spilled material between the perimeter rim and the shelf member. Further, the molded perimeter rim can be made smaller than the perimeter frame of the presently known spill resistant shelf and thereby maximize the available shelf area.

In one aspect to the invention, the perimeter rim is molded around at least a portion of supporting shelf brackets, assuring a secure and durable attachment between the shelf member and the support brackets.

In a further aspect of the invention, a drain is provided for draining a spill from the spill resistant shelf and thereby minimizing the further potential for causing a mess in cleaning up a spill.

In another aspect of the invention, slide tracks are provided along the shelf support brackets for receiving a slidable bin or drawer. In one embodiment the slide tracks are optionally attached to the shelf brackets. In another embodiment, the slide tracks are integrally molded into the shelf support brackets.

In another aspect of the invention, tempered glass is used as the shelf member to enhance light distribution through the refrigerated compartment and to enhance viewing of items supported by the shelving. The sides and back of the shelf are spaced from the walls of the compartment in another aspect of the invention to provide proper circulation around the shelf and the use of the molded perimeter rim allows the formation of a narrow perimeter rim, maximizing the shelf support area.

The present invention provides a durable support rim for a spill resistant refrigerator shelf. The molded perimeter rim maximizes sealing contact between the rim and the shelf member for enhanced spill retention and to minimize the potential for entrapment of food stuffs between the perimeter rim and the shelf member, also minimizing the potential for subsequent development of an unsanitary condition. The use of a molded rim in accordance with the present invention offers enhanced aesthetics by minimizing seams and joints associated with the rim and giving a more streamlined appearance. Such aesthetic benefits are also provided by the use of molded slide tracks for a bin storage unit which can be integrally molded as a single piece with the perimeter rim and the shelf support brackets.

These and other objects, advantages and features of the present invention will become apparent upon review of the following specification in conjunction with the drawings.

DESCRIPTION OF THE PREFERRED EMBODIMENTS

Figure 1:
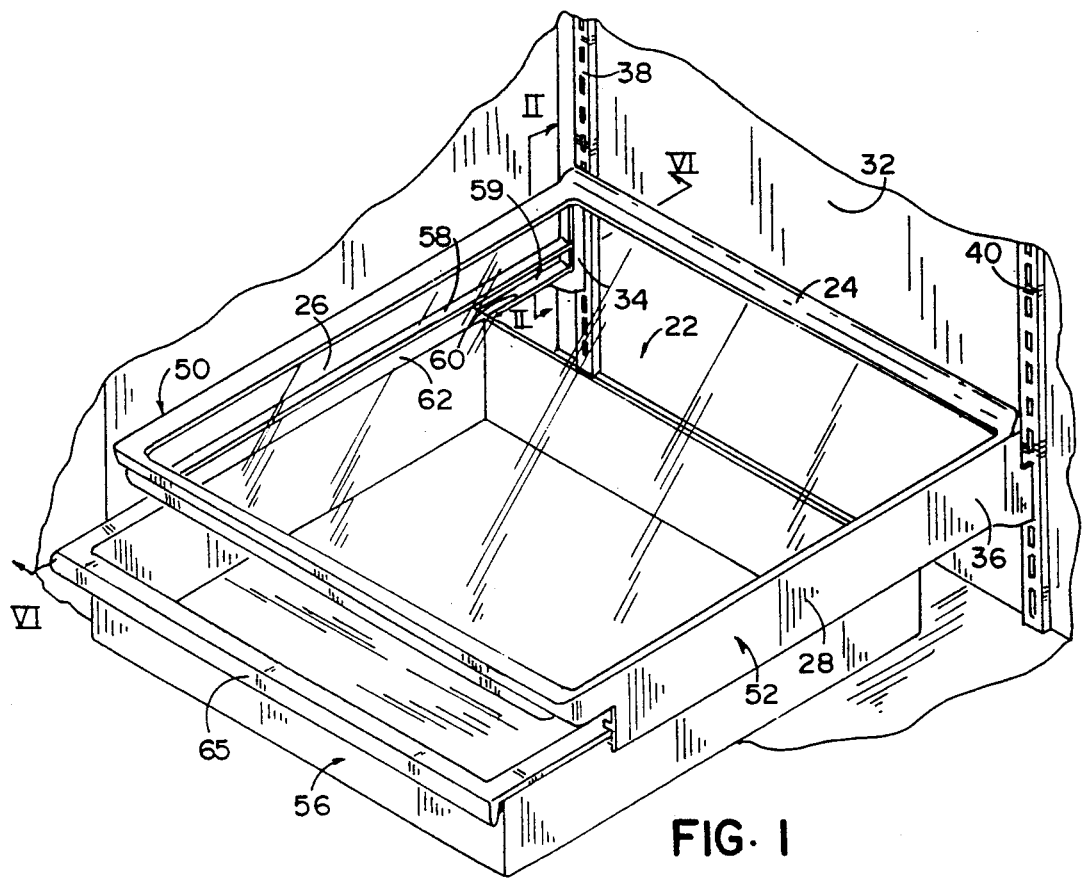
FIG. 1 is a fragmentary perspective view of the interior of a refrigerator showing a shelf according to the present invention.

Referring now to the drawings in greater detail and FIG. 1 in particular, a refrigerator shelf assembly 20, according to the present invention, comprises a shelf panel 22, a perimeter rim 24 and support brackets 26, 28.

Figure 2:
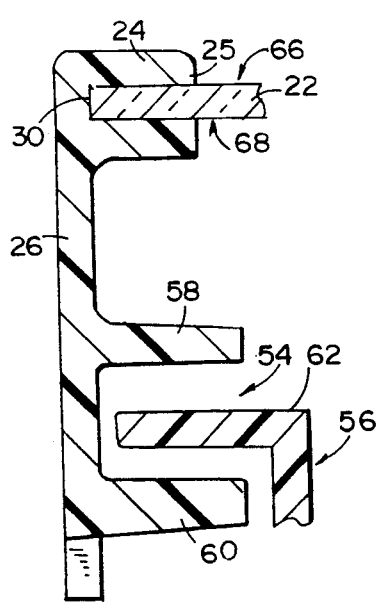
FIG. 2 is a sectional view along section line II—II of FIG. 1.
Figure 3:
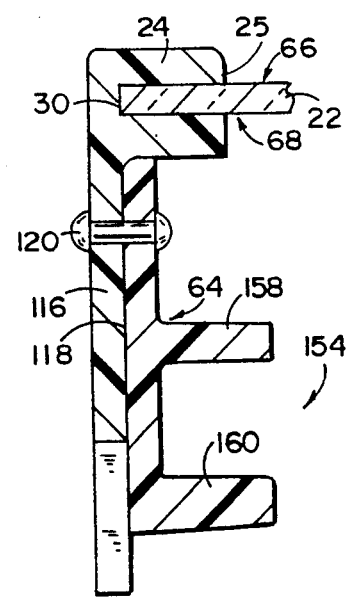
FIG. 3 is an alternative embodiment of FIG. 2.

Shelf panel 22 may be contoured to facilitate a variety of specific purposes, but generally provides a planar surface to support items placed thereon for storage in a refrigerator. Shelf panel 22 may also be formed from a light transmitting material, preferably optically clear, tempered glass, to enhance light distribution through the refrigerator compartment. Shelf panel 22 has a perimeter edge 30 about which perimeter rim 24 is molded (FIGS. 1-3).

Figure 6:
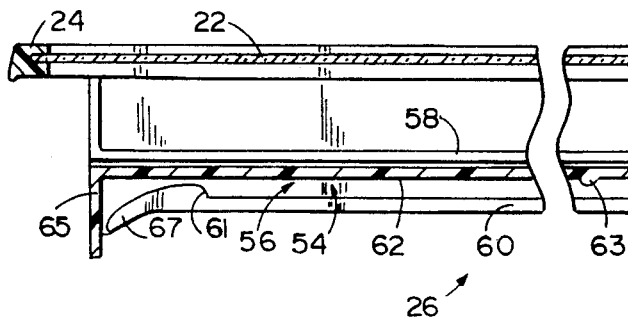
FIG. 6 is a sectional view along section line VI—VI of FIG. 1 storage bin in a closed position.
Figure 7:
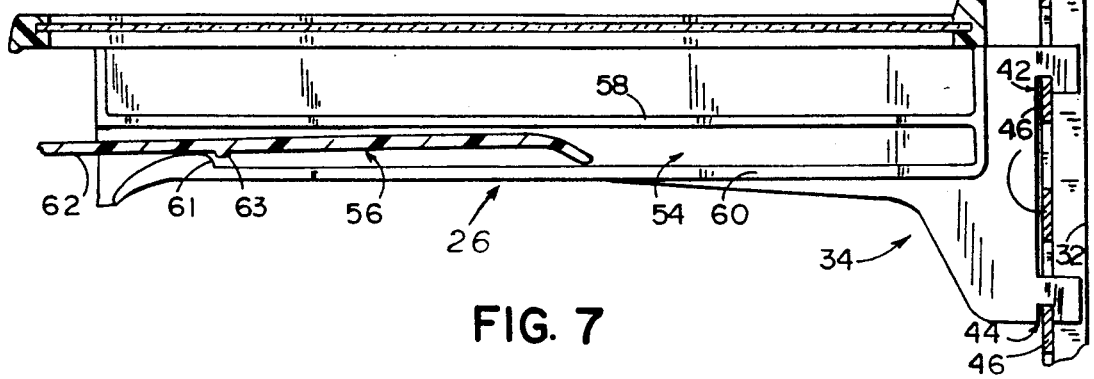
FIG. 7 is a sectional view along section line VI—VI of FIG. 1 the storage bin in an open position.

Shelf assembly 20 is preferably cantilevered forward by brackets 26, 28 from a rear wall 32 of a refrigerator, and is preferably used as a vertically adjustable shelf. Therefore, brackets 26,28 are elongated members, having rear ends 34, 36 which are preferably adapted for releasable engagement with shelf tracks 38, 40, provided on rear wall 32 of the refrigerator as is commonly practiced (FIGS. 1, 6, and 7). Recesses 42, 44, formed in ends 34, 36 function as hooks for engaging rungs 46 in tracks 38, 40 to support brackets 26, 28. Thus, shelf assembly 20 may be positioned at a plurality of locations spaced vertically along tracks 38, 40. Further, shelf assembly 20 is preferably sized to provide air circulation space between the side walls of the refrigerator and the side and rear edges of shelf assembly 20. An air circulation space 48, for example, is provided between perimeter rim 24 and rear wall 32 (FIG. 6).

Brackets 26, 28 extend along at least a portion of opposing sides 50, 52 of shelf assembly 20. In the most preferred embodiment, perimeter rim 24 and support brackets 26, 28 are integrally molded in one piece (FIG. 2). Shelf assembly 20 may optionally be provided with a pair of slide tracks 54 for slidably receiving and supporting a storage bin or drawer 56 (FIGS. 1, 2, 6 and 7). Each slide track 54 is defined between spaced upper and lower slide rails 58, 60. Each slide track 54 receives and guides a corresponding outward extending flange portion 62 of drawer 56.

Drawer 56 may be a metal stamping or plastic molding as is commonly known and extends to an open position for access to the inside of drawer 56. A forward stop 61 is formed along lower rail 60 for engagement with a projecting stop 63 on drawer flange 62 to prevent accidental overextension of drawer 56 (FIGS. 6 and 7). If removal of drawer 56 from slide track 54 is desired, this is easily accomplished by lifting the front end of drawer 56 so that stop 63 passes above stop 61. Conversely, drawer 56 may be positioned under shelf panel 22 in a closed position (FIG. 6). A flange 65 is provided across the front of drawer 56 to provide a handle for pulling drawer 56 to its open position or pushing the drawer to its closed position. Flange 65 in combination with front end 67 of lower rail 60 provide a closure stop for positioning drawer 56 in the closed position.

Perimeter rim 24, support brackets 26, 28 and, optionally, upper and lower slide rails 58, 60 are preferably molded in a convenient one-step process. During assembly, shelf panel 22 is held and positioned within a mold while a moldable material, from which perimeter rim 24, support brackets 26, 28 and, optionally, slide rails 58, 60 are made, is injected and flows into a continuous cavity provided in the mold around perimeter edge 30 of shelf panel 22, thereby encapsulating perimeter edge 30, forming perimeter rim 24, support brackets 26, 28, and slide rails 58, 60 (FIG. 2). The moldable material may include copolymer plastics such as a combination of ethylene and polypropylene or other structural, resinous plastics such as ABS or polyvinyl-chloride. Further, a coloration pigment to provide desired colors may be added to the moldable plastic prior to molding. For example, titanium dioxide may be added for a white coloration.

As the moldable material cures, i.e., cools, hardens, and sets up, it becomes a tough and resilient mass, extending continuously around the perimeter of edge 30 of shelf panel 22, forming support brackets 26, 28 and, optionally, slide rails 58, 60. Perimeter rim 24 is molded to extend above the top surface 66 of shelf panel 22 and is specifically molded to define a continuous vertical wall 25 near the perimeter edge 30 of shelf panel 22. The forming of perimeter rim 24 by molding as a single, continuous piece around perimeter edge 30 creates a liquid tight seal between perimeter rim 24 and shelf panel 22. This liquid tight seal and the configuration of perimeter rim 24 with continuous vertical wall 25 combine to form a spill dam for containing spills which may occur upon shelf panel 22.

Again most preferably, slide rails 58, 60 are integrally molded with support brackets 26, 28 (FIG. 2). However, in an alternative embodiment, a support bracket 116 may be molded without slide track 54 and a slide track 154 may be added to a support bracket 116 by attaching a slide bracket 64 to the inside surface of support bracket 116 (FIG. 3). Slide bracket 64 may be connected to support bracket 116 by rivets 120 or by other commonly known fastening methods, and includes spaced slide rails 158, 160 which function in the same manner as rails 58, 60.

Figure 4:
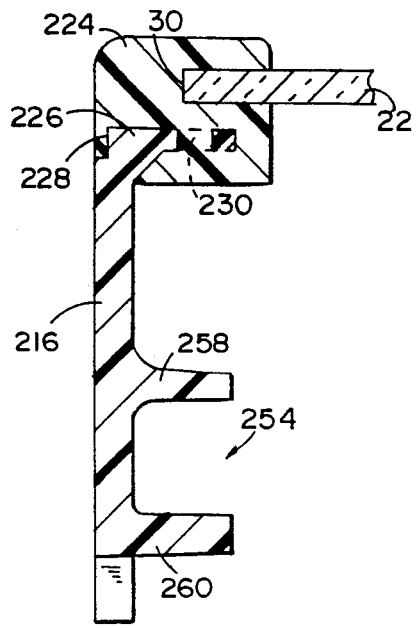
FIG. 4 is a second alternative embodiment of FIG. 2.

In a second alternative embodiment, a support bracket 216 may be molded separately from a perimeter rim 224 (FIG. 4). Support bracket 216 has a support flange portion 226 which projects inward, under shelf panel 22 from the top edge 228 of support bracket 216. A corresponding, mirror image support bracket (not shown) to support bracket 216 is used opposite support bracket 216, across shelf panel 22. A series of apertures 230 may be defined in flange 226 to enhance mechanical attachment between support bracket 216 and perimeter rim 224. During assembly, shelf panel 22, support bracket 216 and the opposing support bracket are held and positioned to project into a cavity, surrounding perimeter edge 30 of shelf panel 22, within a mold while a moldable material is injected and flows into the mold cavity as disclosed above, around the perimeter edge 30 of shelf panel 22 and flange portion 226, encapsulating the perimeter edge 30 and flange portion 226 of each support bracket. Support bracket 216 is preferably molded with integral slide rails 258, 260, defining slide track 254.

Figure 5:
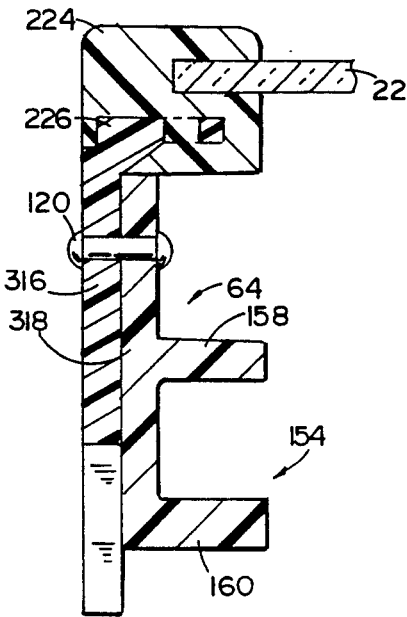
FIG. 5 is a third alternative embodiment of FIG. 2.

In a third alternative embodiment, a support bracket 316, similar to bracket 216 above, is molded without slide rails (FIG. 5). As with bracket 116 above, slide bracket 64 may be optionally attached to the inside surface 318 of support bracket 316, in the same manner as discussed with support bracket 116 above, for providing slide track 154.

Figure 5A:
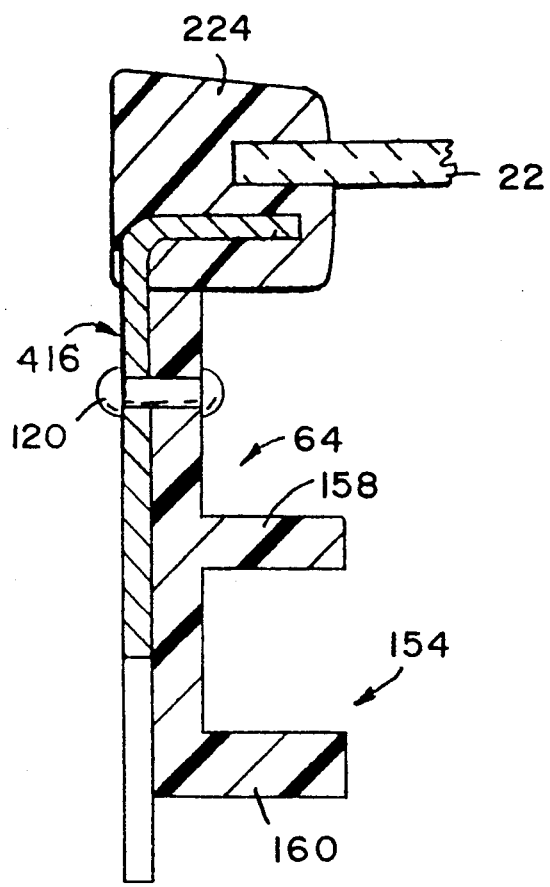
FIG. 5A is a fourth alternative embodiment of FIG. 2.

In a fourth alternative embodiment, [not shown,] slide bracket 64 may also be used in the manner disclosed above, but with a refrigerator shelf assembly which incorporates a metal support bracket 416 (FIG. 5A). Such a shelf assembly is disclosed in [the copending and commonly assigned] parent patent application Ser. No. 665,661, filed on Mar. 7, 1991, and entitled MOLDED REFRIGERATOR SHELF, which application is [hereby] incorporated by reference as noted above.

Figure 8:
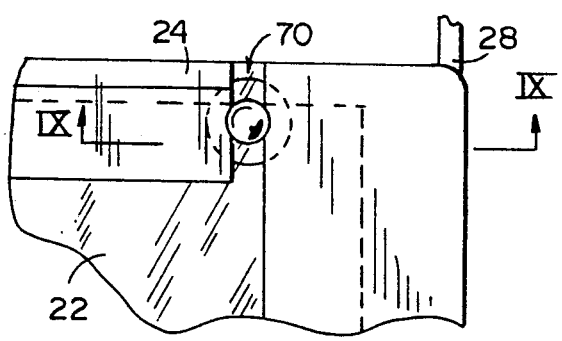
FIG. 8 is a fragmentary plan view of a first alternative embodiment of a drain for the shelf of FIG. 1.
Figure 9:
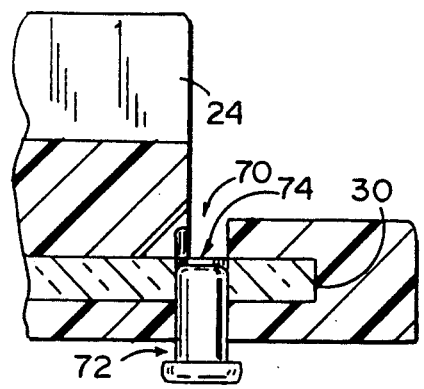
FIG. 9 is a sectional view along section IX—IX of FIG. 8.

For convenience in removing a spill, especially a liquid spill, a drain may be provided in the refrigerator shelf assembly 20. In a first embodiment of a drain for refrigerator shelf assembly 20, drainage channel 70 may be molded into perimeter rim 24 (FIGS. 8 and 9). A drain plug 72 is used to close channel 70 until such time as a spill occurs on the shelf assembly 20 and a user wishes to withdraw plug 72 to drain the spill. A drain hole 74 is provided in channel 70, adjacent perimeter edge 30 of shelf panel 22 for receiving drain plug 72 from the underside of shelf assembly 20. Drain plug 72 and hole 74 are sized so that friction holds drain plug 72 in plug hole 74. Preferably, plug 72 is molded from the same material as perimeter rim 24 and is resilient such that it tightly seals hole 74 and compressingly engages the facing surfaces of rim 24 adjacent channel 70. For balanced esthetics, a second drain or a nonfunctional drain look-alike may be symmetrically located on shelf assembly 20.

Figure 10:
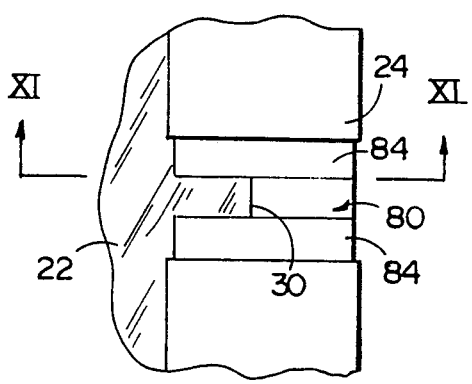
FIG. 10 is a fragmentary plan view of a second alternative embodiment of a drain for the shelf of FIG. 1.
Figure 11:
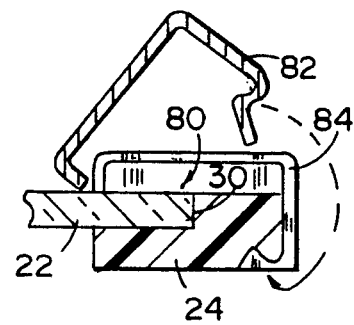
FIG. 11 is a sectional view along section line XI—XI of FIG. 10

A second, alternative embodiment of a drain for shelf assembly 20 is shown in FIGS. 10 and 11. A drainage channel 80 is molded in perimeter rim 24. A flush fitting, clip-like drain plug 82 clips over perimeter rim 24 to close drainage channel 80. A shoulder 84, adjacent to and on either side of drainage channel 80, is recessed into perimeter rim 24 so that plug 82 will fit flush with the outer surface of perimeter rim 24 and is molded to conform to the shape of the inside of plug 82 for good sealing contact. Plug 82 is preferably molded from the same material as perimeter rim 24, but may also be formed from stainless steel or other suitable materials For balanced esthetics, a second drain or a nonfunctional drain look-alike may be symmetrically located on shelf assembly 20.

Figure 12:
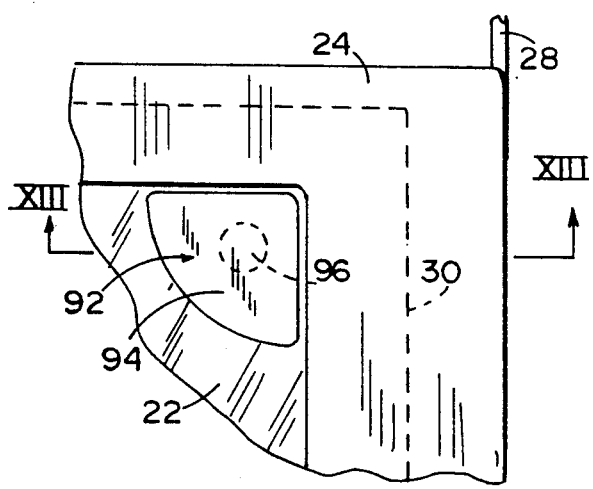
FIG. 12 is a fragmentary plan view of a third alternative embodiment of a drain for the shelf of FIG. 1.
Figure 13:
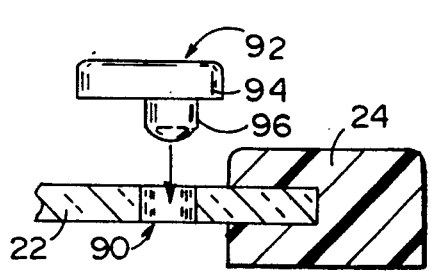
FIG. 13 is a sectional view along section line XIII—XIII of FIG. 12.

A third, alternative embodiment of a drain for shelf assembly 20 is shown in FIGS. 12 and 13. A drain hole 90 is provided through shelf panel 22 and a drain plug 92 having a triangularly shaped head 94 and a cylindrical plug body 96 is provided to close drain hole 90. The shape of head 94 matches the inside corner of rim 24 adjacent hole 90. Preferably, plug 92 is formed from the same material as perimeter rim 24. For balanced esthetics, a second drain or a nonfunctional drain look-alike may be symmetrically located on shelf assembly 20.

Figure 14:
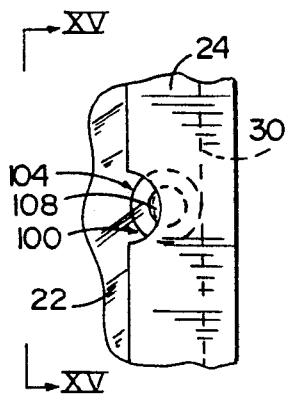
FIG. 14 is a fragmentary plan view of a fourth alternative of a drain for the shelf of FIG. 1.
Figure 15:
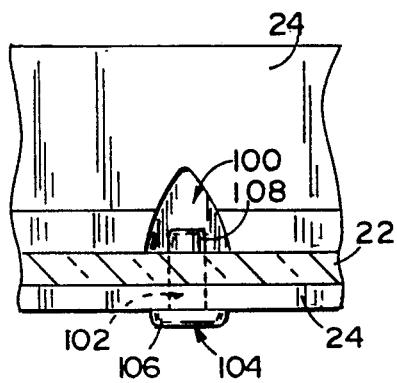
FIG. 15 is a sectional view along section line XV—XV of FIG. 14.

A fourth, alternative embodiment of a drain for shelf assembly 20 is shown in FIGS. 14 and 15. A notch 100 is molded in perimeter rim 24, near perimeter edge 30 of shelf panel 22. A drain hole 102, through shelf panel 22 and the bottom of rim 24, is aligned with notch 100. A drain plug 104, having an enlarged head 106 and cylindrical body 108, is provided to close drain hole 102. Preferably, plug 104 is formed from the same material as perimeter rim 24.

Figure 16:
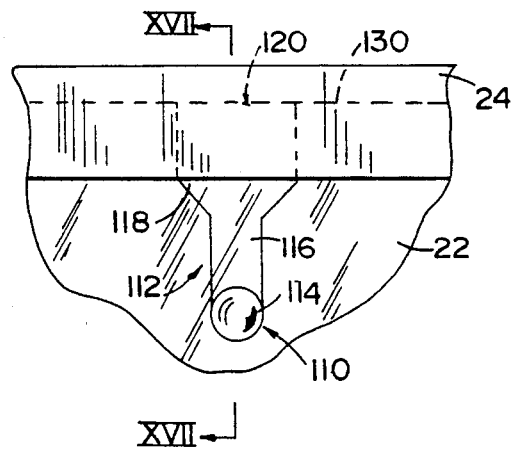
FIG. 16 is a fragmentary plan view of a fifth alternative embodiment of a drain for the shelf of FIG. 1.
Figure 17:
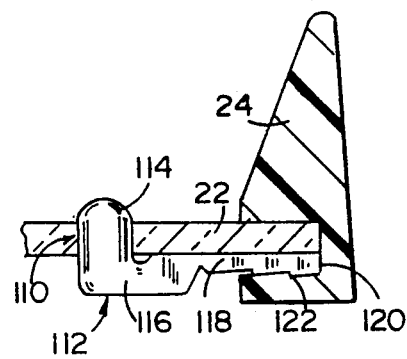
FIG. 17 is a sectional view along section line XVII—XVII of FIG. 16.

A fifth, alternative embodiment of a drain for shelf assembly 20 is shown in FIGS. 16 and 17. A drain hole 110 is provided through shelf panel 22, near perimeter edge 130. A drain plug 112 having a stopper portion 114, a flexible arm 116 and a base portion 118 is provided to close drain hole 110. A notch 120 is molded into perimeter rim 24 to receive base 118 of plug 112. A series of transverse ribs 122 are formed in base 118 for engagement with perimeter rim 24 to resist removal of base 118 from notch 120. Arm 116 extends toward hole 110 from base 118 and provides a flexible and springy positioning member for plug 112. Plug 112 is preferably formed from the same material as perimeter rim 24.

Figure 18:
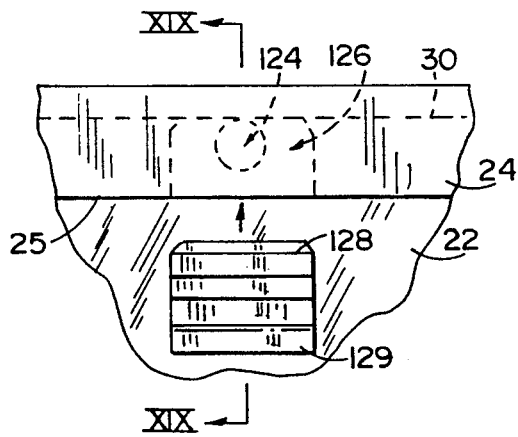
FIG. 18 is a fragmentary plan view of a sixth alternative embodiment of a drain for the shelf of FIG. 1; and FIG. is a sectional view along section line XIX—XIX of FIG. 18.
Figure 19:
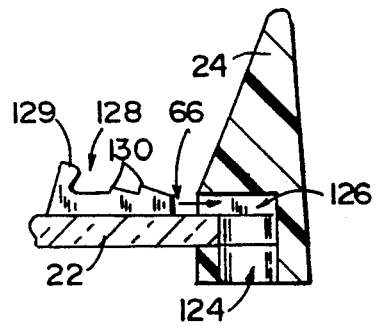

A sixth, alternative embodiment of a drain for shelf assembly 20 is shown in FIGS. 18 and 19. A drain hole 124 is provided adjacent perimeter edge 30. Drain hole 124 extends through shelf member 22 and perimeter rim 24 as shown. A notch 126 is molded into perimeter rim 24. Notch 126 extends from vertical wall 25 to perimeter edge 30 and aligns with drain hole 124 to define a passageway from top surface 66. A drain plug 128, corresponding to notch 126, is removably received in notch 126 for closing and sealing drain hole 124. Drain plug 128 is preferably molded from the same material as perimeter rim 24 and is sized for friction fit with notch 126. A large projecting rib 129 forms a handle for plug 128 and small ribs 130 may be provided to enhance insertion and removal of plug 128.

The above description is considered that of the preferred embodiment only. Modifications of the invention will occur to those who make or use the invention. Therefore, it is understood that the embodiments shown in the drawings and described above are merely for illustrative purposes and are not intended to limit the scope of the invention, which is defined by the following claims as interpreted according to the principles of patent law.

The embodiments of the invention in which an exclusive property or privilege is claimed are defined as follows:

1. A shelf for use in a refrigerated compartment comprising:
   a shelf panel having a perimeter edge and a top surface for receiving and supporting an item set thereupon;
   two molded plastic support brackets supporting said shelf panel;
   a perimeter rim molded in one piece about said perimeter edge, said perimeter rim forming a liquid-tight seal with said shelf panel, each of said support brackets extending from said perimeter rim and away from said shelf panel; and
   a drawer supported under said shelf panel in sliding engagement with said support brackets to slide between a closed position and an open position.

2. A shelf as defined in claim 1 wherein said perimeter rim is molded around at least a portion of each of said support brackets to secure said shelf member and said support brackets together.

3. A shelf as defined in claim 2 wherein each said support bracket has an interior surface which faces the interior surface of the other support bracket and said shelf further includes a slide bracket attached to each said interior surface.

4. A shelf as defined in claim 3 wherein each said support bracket is an elongated member having a predetermined length, wherein said slide bracket includes at least one slide rail for guiding the drawer, and wherein said slide rail extends along at least a portion of the length of said support bracket.

5. A shelf as defined in claim 2 wherein each said support bracket has an interior surface which faces the interior surface of the other support bracket and a slide surface is molded into each said interior surface of said support brackets for engagement with said drawer.

6. A shelf as defined in claim 5 wherein each said support bracket is an elongated member having a predetermined length, wherein said slide surface is defined by a slide rail for guiding the drawer, and wherein said slide rail extends along at least a portion of the length of said support bracket.

7. A shelf for use in a refrigerated compartment comprising:
   a shelf panel, said panel having a top surface for receiving and supporting an item set thereupon and having a perimeter edge;
   at least a pair of molded plastic support brackets for supporting said shelf panel; and
   a single piece, perimeter rim molded about said perimeter edge, said perimeter rim forming a liquid tight seal with said shelf panel, said brackets each extending from said perimeter rim, said perimeter rim projecting above said top surface to define a spill dam so that a liquid disposed upon said top surface is contained by said perimeter rim, said perimeter rim and about support brackets being integrally molded in one piece.

8. A shelf as defined in claim 7 wherein said shelf further includes slide means for receiving and supporting a drawer under said shelf panel so that the drawer may be said between a closed position and an open position.

9. A shelf as defined in claim 8 wherein each said support bracket has an interior surface which faces the interior surface of the other support bracket and said slide means includes a slide bracket attached to each said interior surface.

10. A shelf as defined in claim 9 wherein each said support bracket is an elongated member having a predetermined length, wherein said slide bracket includes at least one slide rail for guiding the drawer, and wherein said slide rail extends along at least a portion of the length of said support bracket.

11. A shelf as defined in claim 8 wherein each said support bracket has an interior surface which faces the interior surface of the other support bracket and said slide means is molded into each said interior surface of said support brackets.

12. A shelf as defined in claim 11 wherein each said support bracket is an elongated member having a predetermined length, wherein said slide means includes at least one slide rail for guiding the drawer, and wherein said slide rail extends along at least a portion of the length of said support bracket.

13. A shelf for use in a refrigerated compartment comprising:
    a shelf panel, said shelf panel having a top surface for receiving and supporting an item set thereupon and having a perimeter edge;
    a perimeter rim, said perimeter rim being a single piece and molded about said perimeter edge, said perimeter rim forming a liquid-tight seal with said shelf panel; and
    support means for supporting said shelf panel, said support means extending from said perimeter rim and away from said shelf panel, said support means including a slide surface for receiving and supporting a drawer under said shelf panel in sliding engagement with said support means so the drawer may be slid between a closed position and an open position.

14. The shelf as defined in claim 13 wherein a liquid tight seal is formed between said perimeter rim and said shelf panel and wherein said perimeter rim projects above said top surface to define a spill dam so that a liquid disposed upon said top surface is contained by said perimeter rim.

15. A shelf as defined in claim 14 wherein said support means includes at least a pair of support brackets, each said support bracket having an interior surface which faces the interior surface of the other support bracket 16. A shelf as defined in claim 15 wherein said perimeter rim is molded around at least a portion of said support brackets so that said shelf member and said support means are secured together by said perimeter rim.

17. A shelf as defined in claim 16 wherein said slide means includes a slide bracket attached to each said interior surface.

18. A shelf as defined in claim 17 wherein each said support bracket is an elongated member having a predetermined length, wherein said slide bracket includes at least one slide rail for guiding the drawer, and wherein said slide rail extends along at least a portion of the length of said support bracket.

19. A shelf as defined in claim 18 wherein said shelf further includes drain means for draining a spilled liquid item from said shelf.

20. A shelf as defined in claim 16 wherein said slide means is molded into each said interior surface of said support brackets.

21. A shelf as defined in claim 20 wherein each said support bracket is an elongated member having a predetermined length, wherein said slide means includes at least one slide rail for guiding the drawer, and wherein said slide rail extends along at least a portion of the length of said support bracket.

22. A shelf as defined in claim 21 wherein said shelf further includes drain means for draining a spilled liquid item from said shelf.

23. A shelf for use in a refrigerated compartment comprising:
a shelf panel, said shelf panel having a top surface for receiving and supporting an item set thereupon and having a perimeter edge;
support means for supporting said shelf panel, said support means including at least a pair of support brackets, each said support bracket having an interior surface which faces the interior surface of the other support bracket;
a perimeter rim, said perimeter rim bing a single piece and molded about said perimeter edge said perimeter rim forming a liquid tight seal with said shelf panel, said perimeter rim projecting above sid top surface to define a spill dam so tht a liquid disposed upon said top surface is contained by said perimeter rim, said perimeter rim and said support brackets being integrally molded; and
slide means for receiving and supporting a drawer under said shelf panel so that the drawer may be slid between a closed position and an open position.

24. A shelf as defined in claim 23 wherein said slide means includes a slide bracket attached to each said interior surface.

25. A shelf as defined in claim 24 wherein each said support bracket is an elongated member having a predetermined length, wherein said slide bracket includes at least one slide rail for guiding the drawer, and wherein said slide rail extends along at least a portion of the length of said support bracket.

26. A shelf as defined in claim 25 wherein said shelf further includes drain means for draining a spilled liquid item from said shelf.

27. A shelf as defined in claim 23 wherein said slide means is molded into each said interior surface of said support brackets.

28. A shelf as defined in claim 27 wherein each said support bracket is an elongated member having a predetermined length, wherein said slide means includes at least one slide rail for guiding the drawer, and wherein said slide rail extends along at least a portion of the length of said support bracket.

29. A shelf as defined in claim 28 wherein said shelf further includes drain means for draining a spilled liquid item from said shelf.

30. A shelf as defined in claim 29 wherein said drain means defines an aperture through said shelf panel near said perimeter edge and includes plug means for closing said aperture.

31. A shelf as defined in claim 29 wherein said drain means defines a channel which extends through said perimeter rim from said top surface and includes plug means for closing said channel.

32. A shelf for use in a refrigerated compartment comprising;
a shelf panel, said shelf panel having a top surface for receiving and supporting an item set thereupon and having a perimeter edge;
support means for supporting said shelf panel;
a perimeter rim, said perimeter rim being a single piece, molded about said perimeter edge, and defining a spill dam so that a liquid disposed upon said top surface is contained by said perimeter rim; and
a drain for draining liquid contained by said spill dam from said top surface without removing said shelf.

33. A shelf for use n a refrigerated compartment comprising:
a shelf panel, said shelf panel having a top surface for receiving and supporting an item set thereupon and having a perimeter edge;
support means for supporting said shelf panel;
a perimeter rim, said perimeter rim being a single piece, molded about said perimeter edge, and defining a spill dam so that a liquid disposed upon said top surface is contained by said perimeter rim; and
drain means for draining liquid contained by said spill dam from said top surface, said drain means including an aperture through said shelf panel, near said perimeter edge, and including plug means for closing said aperture.

34. A shelf as defined in claim 33 wherein said support means includes at least a pair of support brackets, each said support bracket having an interior surface which faces the interior surface of the other support bracket 35. A shelf as defined in claim 34 wherein said perimeter rim is molded around at least a portion of said support brackets so that said shelf member and said support means are secured together by said perimeter rim.

36. A shelf as defined in claim 35 wherein said shelf further includes slide means for receiving and supporting a drawer under said shelf panel so that the drawer may be slid between a closed position and an open position.

37. A shelf as defined in claim 36 wherein said slide means includes a slide bracket attached to each said interior surface.

38. A shelf as defined in claim 37 wherein each said support bracket is an elongated member having a predetermined length, wherein said slide bracket includes at least one slide rail for guiding the drawer, and wherein said slide rail extends along at least a portion of the length of said support bracket.

39. A shelf as defined in claim 36 wherein said slide means is molded into each said interior surface.

40. A shelf as defined in claim 39 wherein each said support bracket is an elongated member having a predetermined length, wherein said slide means includes at least one slide rail for guiding the drawer, and wherein said slide rail extends along at least a portion of the length of said support bracket.

41. A shelf as defined in claim 34 wherein said perimeter rim and said support brackets are integrally molded in one piece.

42. A shelf as defined in claim 41 wherein said shelf further includes slide means for receiving and supporting a drawer under said shelf panel so that the drawer may be slid between a closed position and an open position.

43. A shelf as defined in claim 42 wherein said slide means includes a slide bracket attached to each said interior surface.

44. A shelf as defined in claim 43 wherein each said support bracket is an elongated member having a predetermined length, wherein said slide bracket includes at least one slide rail for guiding the drawer, and wherein said slide rail extends along at least a portion of the length of said support bracket.

45. A shelf as defined in claim 42 wherein said slide means is molded into each said interior surface.

46. A shelf as defined in claim 45 wherein each said support bracket is an elongated member having a predetermined length, wherein said slide means includes at least one slide rail for guiding the drawer, and wherein said slide rail extends along at least a portion of the length of said support bracket.

47. A shelf for use in a refrigerated compartment comprising:
- a shelf panel, said shelf panel having a top surface for receiving and supporting an item set thereupon and having a perimeter edge;
- support means for supporting said shelf panel;
- a perimeter rim, said perimeter rim being a single piece, molded about said perimeter edge, and defining a spill dam so that a liquid disposed upon said top surface is contained by said perimeter rim; and
- drain means for draining liquid contained by said spill dam from said top surface, said drain means including a channel which extends through said perimeter rim from said top surface and including plug means for closing said channel.

48. A shelf defined in claim 47 wherein said support means includes at least a pair of support brackets, each said support bracket having an interior surface which faces the interior surface of the other support bracket.

49. A shelf as defined in claim 48 wherein said perimeter rim is molded around at least a portion of said support brackets so that said shelf member and said support means are secured together by said perimeter rim.

50. A shelf as defined in claim 49 wherein said shelf further includes slide means for receiving and supporting a drawer under said shelf panel so that the drawer may be slid between a closed position and an open position.

51. A shelf as defined in claim 50 wherein said slide means includes a slide bracket attached to each said interior surface.

52. A shelf as defined in claim 51 wherein each said support bracket is an elongated member having a predetermined length, wherein said slide bracket includes at least one slide rail for guiding the drawer, and wherein said slide rail extends along at least a portion of the length of said support bracket.

53. A shelf as defined in claim 50 wherein said slide means is molded into each said interior surface.

54. A shelf as defined in claim 53 wherein each said support bracket is an elongated member having a predetermined length, wherein said slide means includes at least one slide rail for guiding the drawer, and wherein said slide rail extends along at least a portion of the length of said support bracket.

55. A shelf as defined in claim 49 wherein said perimeter rim and said support brackets are integrally molded in one piece.

56. A shelf as defined in claim 55 wherein said shelf further includes slide means for receiving and supporting a drawer under said shelf panel so that the drawer may be slid between a closed position and an open position.

57. A shelf as defined in claim 56 wherein said slide means includes a slide bracket attached to each said interior surface.

58. A shelf as defined in claim 57 wherein each said support bracket is an elongated member having a predetermined length, wherein said slide bracket includes at least one slide rail for guiding the drawer, and wherein said slide rail extends along at least a portion of the length of said support bracket.

59. A shelf as defined in claim 56 wherein said slide means is molded into each said interior surface.

60. A shelf as defined in claim 59 wherein each said support bracket is an elongated member having a predetermined length, wherein said slide means includes at least one slide rail for guiding the drawer, and wherein said slide rail extends along at least a portion of the length of said support bracket.

61. A shelf for use in a refrigerated compartment comprising:
- a shelf panel having a perimeter edge and a top surface for receiving and supporting an item set thereupon;
- two molded plastic support brackets supporting said shelf panel, said support brackets extending away from said shelf panel;
- a perimeter rim molded in one piece about said perimeter edge, said perimeter rim forming a liquid tight seal with said shelf panel, said perimeter rim projecting above said top surface to define a spill dam and contain a liquid disposed upon said top surface; and
- a drain for draining liquid contained by said spill dam from said shelf without removing said shelf.

62. A shelf for use in a refrigerated compartment comprising:
- a shelf panel, said panel having a top surface for receiving and supporting an item set thereupon and having a perimeter edge;
- at least a pair of molded plastic support brackets for supporting said shelf panel;
- a single piece, perimeter rim molded about said perimeter edge, said perimeter rim forming a liquid tight seal with said shelf panel, said brackets each extending from said perimeter rim, said perimeter rim projecting above said top surface to define a spill dam so that a liquid disposed upon said top surface is contained by said perimeter rim; and
- drain means for draining a spilled liquid from said shelf, said drain means including an aperture through said shelf panel near said perimeter edge and including plug means for closing said aperture.

63. A shelf for use in a refrigerated compartment comprising:

a shelf panel, said panel having a top surface for receiving and supporting an item set thereupon and having a perimeter edge;

at least a pair of molded plastic support brackets for supporting said shelf panel;

a single piece, perimeter rim molded about said perimeter edge, said perimeter rim forming a liquid tight seal with said shelf panel, said brackets each extending from said perimeter rim, said perimeter rim projecting above said top surface to define a spill dam so that a liquid disposed upon said top surface is contained by said perimeter rim; and drain means for draining a spilled liquid from said shelf, said drain means including a channel which extends through said perimeter rim from said top surface and including plug means for closing said channel.

* * * * *

UNITED STATES PATENT AND TRADEMARK OFFICE
CERTIFICATE OF CORRECTION

PATENT NO. : 5,273,354
DATED : December 28, 1993
INVENTORS : Herrmann et al.

It is certified that error appears in the above-identified patent and that said Letters Patent is hereby corrected as shown below:

Column 3, line 27;

After "FIG. 1" insert –with the– therefor.

Column 3, line 29;

After "FIG. 1" insert –with– therefor.

Column 3, line 32;

After "section" insert –line– therefor.

Column 3, line 43;

Before "of a drain" insert –embodiment– therefor.

Column 3, line 53;

After "FIG." insert –19– therefor.

Column 5, line 51;

After "embodiment," delete –[not shown,]– therefor.

UNITED STATES PATENT AND TRADEMARK OFFICE
CERTIFICATE OF CORRECTION

PATENT NO.  : 5,273,354
DATED       : December 28, 1993
INVENTORS   : Herrmann et al.

It is certified that error appears in the above-identified patent and that said Letters Patent is hereby corrected as shown below:

Column 5, lines 55 and 56;

After "disclosed in" delete –[the copending and commonly assigned]– therefor.

Column 5, line 59;

Before "incorporated" delete –[hereby]– therefor.

Column 6, line 23;

After "materials" insert –.– therefor.

Column 8, line 5, claim 7;

"about" should be –said– therefor.

Column 8, line 10, claim 8;

"may be said" should be –may be slid– therefor.

Column 9, line 36, claim 23;

"rim bing" should be –rim being– therefor.

UNITED STATES PATENT AND TRADEMARK OFFICE
CERTIFICATE OF CORRECTION

PATENT NO. : 5,273,354
DATED : December 28, 1993
INVENTORS : Herrmann et al.

It is certified that error appears in the above-identified patent and that said Letters Patent is hereby corrected as shown below:

Column 9, line 39, claim 23;

"above sid" should be --above said-- therefor.

Column 9, line 40, claim 23;

"so tht" should be --so that-- therefor.

Column 10, line 24, claim 33;

"use n" should be --use in-- therefor.

Signed and Sealed this

Twenty-fifth Day of October, 1994

Attest:

BRUCE LEHMAN

Attesting Officer

Commissioner of Patents and Trademarks